(12) United States Patent
Tseng et al.

(10) Patent No.: US 10,919,202 B1
(45) Date of Patent: Feb. 16, 2021

(54) MOLDING SYSTEM FOR PREPARING INJECTION-MOLDED ARTICLE

(71) Applicant: CORETECH SYSTEM CO., LTD., Chupei (TW)

(72) Inventors: Huan-Chang Tseng, Chupei (TW); Rong-Yeu Chang, Chupei (TW); Chia-Hsiang Hsu, Chupei (TW)

(73) Assignee: CORETECH SYSTEM CO., LTD., Chupei (TW)

( * ) Notice: Subject to any disclaimer, the term of this patent is extended or adjusted under 35 U.S.C. 154(b) by 0 days.

(21) Appl. No.: 16/897,816

(22) Filed: Jun. 10, 2020

Related U.S. Application Data

(60) Provisional application No. 62/886,608, filed on Aug. 14, 2019.

(51) Int. Cl.
 *B29C 45/76* (2006.01)
 *B29C 45/77* (2006.01)

(52) U.S. Cl.
 CPC ........ *B29C 45/7693* (2013.01); *B29C 45/766* (2013.01); *B29C 45/77* (2013.01); *B29C 2945/76006* (2013.01); *B29C 2945/76187* (2013.01); *B29C 2945/76257* (2013.01); *B29C 2945/76545* (2013.01); *B29K 2995/0044* (2013.01); *G05B 2219/45244* (2013.01)

(58) Field of Classification Search
 CPC ..... B29C 45/0005; B29C 45/76; B29C 45/77; B29C 2045/0008; B29C 2945/76652; B29C 2945/76006; B29C 2945/76056; B29C 2945/76545; B29C 2945/76381; B29C 2945/76665; B29C 2945/7604; B29C 2945/76859; B29C 2945/76187; B29K 2101/12; B29K 2995/0044
 See application file for complete search history.

(56) References Cited

U.S. PATENT DOCUMENTS

| | | | |
|---|---|---|---|
| 8,768,662 B2 * | 7/2014 | Chang | G06F 30/20 703/2 |
| 10,201,918 B1 | 2/2019 | Favaloro et al. | |
| 10,201,921 B1 | 2/2019 | Tseng et al. | |

OTHER PUBLICATIONS

Shishir Ray, "A Three-Dimensional Flow Simulation Using a Viscoelastic Constitutive Equation and a Segregated Finite Element Scheme," Mar. 2000, 192 pages.

(Continued)

*Primary Examiner* — Jacob T Minskey
*Assistant Examiner* — Caroline Montiel
(74) *Attorney, Agent, or Firm* — Muncy, Geissler, Olds & Lowe, PC

(57) ABSTRACT

The present disclosure provides a molding system for preparing injection-molded articles. The molding system includes a molding machine; a mold disposed on the molding machine and having a mold cavity for being filled with a molding resin; a processing module configured to generate an anisotropic viscosity distribution of the molding resin in the mold cavity based on a molding condition for the molding machine, wherein the anisotropic viscosity distribution of the molding resin is generated based in part on an elastic effect of the molding resin; and a controller operably communicating with the processing module and configured to control the molding machine with the molding condition using the generated anisotropic viscosity distribution of the molding resin to perform an actual molding process for preparing the injection-molded article.

6 Claims, 15 Drawing Sheets

(56) References Cited

OTHER PUBLICATIONS

Favaloro et al., "A new anisotropic viscous constitutive model for composites molding simulation," 2018, Composites Part A vol. 115, pp. 112-122, 11 pages.
Tseng et al., "The use of informed isotropic constitutive equation to simulate anisotropic rheological behaviors in fiber suspensions," 2019, J. Rheol. 63(2), pp. 263-274, 12 pages.
Peters et al., "On the performance of enhanced constitutive models for polymer melts in a cross-slot flow," Journal of Non-Newtonian Fluid Mechanics, 1999, vol. 82, pp. 387-427, 41 pages.
Chang et al., "Numerical simulation of mold filling in injection molding using a three-dimensional finite volume approach," International Journal for Numerical Methods in Fluids, 2001, vol. 37, pp. 125-148, 24 pages.

\* cited by examiner (a) Slow flow rate (b) Fast flow rate

MOLDING SYSTEM FOR PREPARING INJECTION-MOLDED ARTICLE

CROSS-REFERENCE TO RELATED APPLICATION

This patent application claims priority under 35 U.S.C. § 119(e) from Provisional Patent Application No. 62/886,608, filed on Aug. 14, 2019, the disclosure of which is incorporated by reference herein in its entirety, including all exhibits appended to Provisional Patent Application No. 62/886,608.

TECHNICAL FIELD

The present disclosure relates to a molding system for preparing an injection-molded article, and more particularly, to an injection-molding system for preparing an injection-molded article using a computer-aided engineering (CAE) simulation.

DISCUSSION OF THE BACKGROUND

In plastics manufacturing, the actual flow of polymer melts is transient, non-Newtonian and non-isothermal, with frozen layers building up as the complex mixture flows through the mold cavity. Characteristics of a finished product are determined by many complex factors, such as changes in the direction of flow, inclusion of ribs, and changes in thickness and holes. To control the quality of the products, a deep understanding of complicated flow fields is critical. Nowadays, CAE (computer-aided engineering) software provides realistic simulation and predictive analysis for complex flows of complex fluids.

According to results of academic research of fluid mechanics and rheology, a strain rate that indicates a rate of deformation of a material with respect to time plays an essential role in the physics of fluids. Strain includes both shear and extension deformations. As a rule, both have been investigated separately.

In practice, a complex geometric channel flow is a combination of shear flow and extension flow. For the complex flow, a generalized strain rate that can be determined with certainty is widely applied in the CAE tool. Flows in injection molding are dominated by shear flows, but extension flows are encountered, such as the contraction flow at gate and nozzle regions, and the fountain flow of a melt front in the cavity. However, the generalized strain rate is not decomposed into individual rates of shear and extension. To resolve such significant issue, the present invention proposes the principal shear rate and the principal extension rate to be obtained from the generalized strain rate. In addition, a new quantity is defined to show the degree of shear and extension variance with respect to flow geometric features. This is based on extensive research of complicated flow phenomena related to shear and extension.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

The present disclosure provides a molding system for preparing an injection-molded article, comprising: a molding machine; a mold disposed on the molding machine and having a mold cavity for being filled with a molding resin; a processing module configured to generate an anisotropic viscosity distribution of the molding resin in the mold cavity based on a molding condition for the molding machine, wherein the anisotropic viscosity distribution of the molding resin is generated based in part on an elastic effect of the molding resin; and a controller operably communicating with the processing module and configured to control the molding machine with the molding condition using the generated anisotropic viscosity distribution of the molding resin to perform an actual molding process for preparing the injection-molded article.

In some embodiments, the processing module is configured to generate a velocity distribution of the molding resin in the mold cavity, and the anisotropic viscosity distribution of the molding resin is generated based on the velocity distribution.

In some embodiments, the processing module is configured to generate the anisotropic viscosity distribution based in part on an anisotropic viscoelastic (VE) stress distribution of the molding resin in the mold cavity.

In some embodiments, the anisotropic viscosity distribution is represented using an expression:

$$\eta^* = \frac{\tau^{VE}:D}{2D:D}$$

where $\eta^*$ represents an effective viscosity scalar, $\tau^{VE}$ represents the anisotropic viscoelastic stress distribution of the molding resin in the mold cavity, and D represents a rate-of-strain tensor.

In some embodiments, the anisotropic viscoelastic stress distribution is represented using an expression:

$$\lambda_0 \overset{\triangledown}{\tau} + f(I_\tau)\tau = 2\eta_0 D$$

$$f(I_\tau) = 1 + \varepsilon \frac{\lambda_0}{\eta_0} I_\tau$$

$$I_\tau = tr(\tau) = \tau_{11} + \tau_{22} + \tau_{33}$$

where $\lambda_0$ is the relaxation time and $\eta_0$ is the viscosity constant; $\overset{\triangledown}{\tau}$ is upper convected time derivative of the extra stress tensor; $\varepsilon$ is the adjustable parameter; $\tau_{11}$, $\tau_{22}$, and $\tau_{33}$ are normal stress components.

In some embodiments, the anisotropic viscoelastic stress distribution is represented using an expression:

$$\tau = \int_{-\infty}^{t} M(t-t')[\phi_1(I_B,II_B)B(t,t')+\phi_2(I_B,II_B)B^{-1}(t,t')]dt'$$

where $M(t-t')$ is a time-memory function; $h(I_B, II_B)$ is a damping function of the two invariants ($I_B$, $II_B$) of the Finger strain tensor B; $t'$ and $t$ are the past and present times, respectively.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

The following description of the disclosure accompanies drawings, which are incorporated in and constitute a part of this specification, and illustrate embodiments of the disclosure, but the disclosure is not limited to the embodiments. In addition, the following embodiments can be properly integrated to complete another embodiment.

References to "one embodiment," "an embodiment," "exemplary embodiment," "other embodiments," "another embodiment," etc. indicate that the embodiment(s) of the disclosure so described may include a particular feature, structure, or characteristic, but not every embodiment necessarily includes the particular feature, structure, or characteristic. Further, repeated use of the phrase "in the embodiment" does not necessarily refer to the same embodiment, although it may.

The present disclosure is directed to a molding system for preparing an injection-molded article using a computer-aided engineering (CAE) simulation. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

Polymers/Plastics applications can be found in almost all areas of everyday living due to their versatility as an economically attractive option in the manufacturing industry. Viscoelasticity (VE) is a primary property of polymer materials that exhibit both "viscous" and "elastic" characteristics. Polymer materials can be processed by fast, highly-automated methods, such as injection molding.

Figure 1:
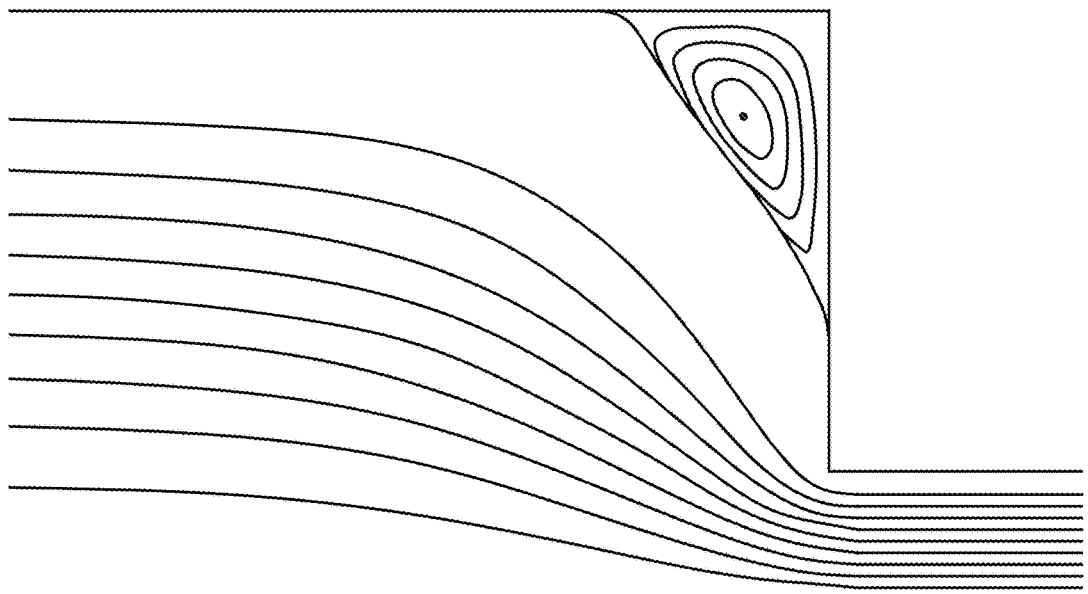
FIG. 1 and FIG. 2 show the flow lines in 4:1 planar contraction flow patterns with a corner vortex. For polymer fluids, the vortex size is increased with increasing flow rate because of the Viscoelastic (VE) property.
Figure 2:
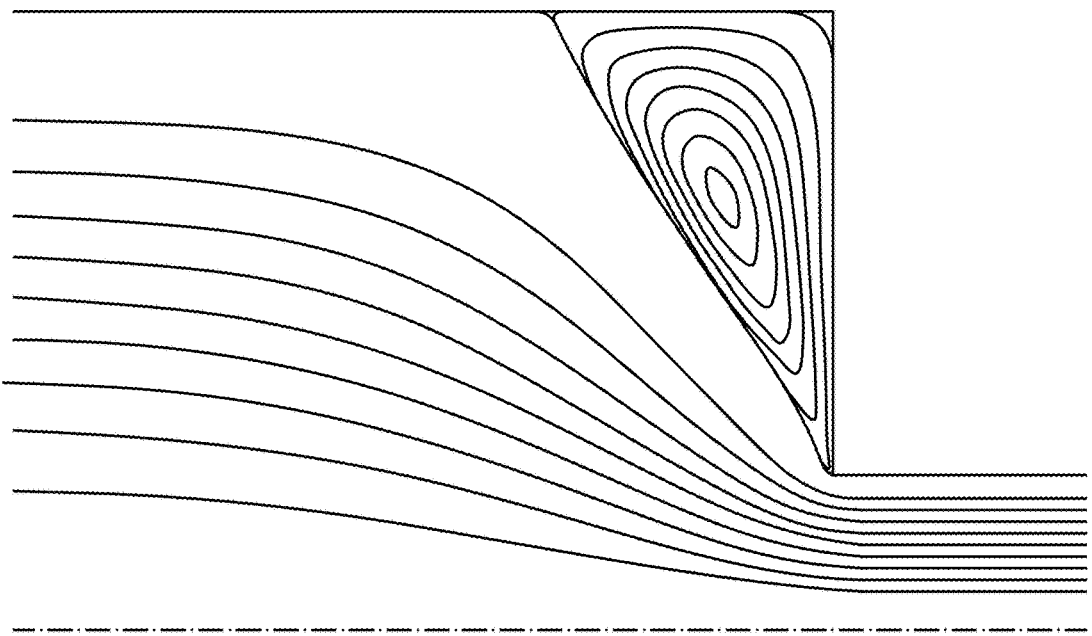

Thickness-variation or contraction channels are widely used in production of injection-molding products. An obvious and significant vortex is found in the corner of the thicker upstream channel FIG. 1 (slower flow rate) and FIG. 2 (faster flow rate) show the flow lines in 4:1 planar contraction flow patterns with a corner vortex. For polymer fluids, the vortex size is increased with increasing flow rate because of the VE property (see, Bird, R. B., R. C. Armstrong, and O. Hassager, *Dynamics of Polymeric Liquids: Fluid Mechanics* (Wiley-Interscience, New York, 1987)).

In the academic community, the polymer rheology has completely developed numerous mathematical models of the VE constitutive equations. The constitutive equations qualitatively and phenomenologically describe complicated changes in stress tensor with respect to time, involving both differential and integral forms (See, Bird, R. B., R. C. Armstrong, and O. Hassager, *Dynamics of Polymeric Liquids: Fluid Mechanics* (Wiley-Interscience, New York, 1987)). Note that the differential constitutive equation is famous to apply in the VE flow simulations. Over the last two decade, the 3D computational fluid dynamics (3D-CFD) has been essential for commercial software of injection molding in the plastic manufacturing. So far, the development of reliable routines for 3D-VE simulations of the four-to-one contraction flow with corner vortex has been the difficult object of much research efforts, due to easily yielding divergent numerical problems practically in high flow rates. However, a precise 3D-numerical simulation of VE flow in complex industrial geometries is still a largely unresolved challenge for the CAE (Computer-Aided Engineering) society (See, Bird, R. B., R. C. Armstrong, and O. Hassager, *Dynamics of Polymeric Liquids: Fluid Mechanics* (Wiley-Interscience, New York, 1987)); Ray, S., "Three-Dimensional Flow Simulation Using a Viscoelastic Constitutive Equation and a Segregated Finite Element Scheme," Ph.D. Thesis, Swinburne University of Technology (2000)).

More recently, for "fiber-filled" polymer materials the inventors of Favaloro et al. and Tseng et. al. (See, Favaloro, A. J., H.-C. Tseng, and R. B. Pipes, "A New Anisotropic Viscous Constitutive Model for Composites Molding Simulation," Composites Part A: Applied Science and Manufacturing 115 112-122 (2018); Tseng, H.-C. and A. J. Favaloro, "The Use of Informed Isotropic Constitutive Equation to Simulate Anisotropic Rheological Behaviors in Fiber Suspensions," J Rheol 63 263-274 (2019); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. Pat. No. 10,201,921 (2019)) have developed the so-called informed isotropic (IISO) viscosity model in order to overcome the previous numerical convergent issue in the flow simulation. Before the IISO computation, the fiber orientation states are necessary to be determined. It is an important IISO conception that the steady-state stress tenor, which is related to the anisotropic viscosity tensor and the fiber orientation tensor, is transferred to obtain the viscosity scalar. Nowadays, state-of-the-art CAE tools do not provide satisfactory simulations of VE flow behaviors for polymer fluids. Based on the IISO conception, is the present invention is proposed in which the stress tensor evolved from the VE constitutive equations is transfer to an effective VE viscosity. Therefore, the objective of the invention is to effectively improve the numerical convergent issue in high flow rates for the contraction channel, and successfully simulate the 3D corner vortex.

The actual flow of polymer melts is transient, non-Newtonian and non-isothermal, with frozen layers building up as the complex mixture flows through the mold cavity. The governing equations of the fluid mechanics (See Bird, R. B., R. C. Armstrong, and O. Hassager, *Dynamics of Polymeric Liquids: Fluid Mechanics* (Wiley-Interscience, New York, 1987)) include the equation of continuity, the equation of motion, and the equation of energy to describe the transient and non-isothermal flow motion are as follows:

$$\frac{\partial \rho}{\partial t} + \nabla \cdot \rho u = 0 \tag{1}$$

$$\frac{\partial}{\partial t}(\rho u) + \nabla \cdot (\rho u u) = -\nabla P + \nabla \cdot \tau + \rho g \tag{2}$$

$$\rho C_P \left( \frac{\partial T}{\partial t} + u \cdot \nabla T \right) = \nabla \cdot (k \nabla T) + \tau : D \tag{3}$$

where $\rho$ is the density; u the velocity vector; t the time; $\tau$ the extra stress tensor; $\nabla u$ the velocity gradient tensor; D the rare-of-deformation tensor (i.e., symmetric tensor of $\nabla u$); g the acceleration vector of gravity; P the pressure; $C_p$ the specific heat; T the temperature; k the thermal conductivity. The viscoelastic properties of polymer fluids are related to the extra stress tensor $\tau$ [see Eq. (2)]. For the multi-mode applications of linear viscoelastic spectrum (relaxation time and viscosity constant), the stress $\tau$ can be expressed as the sum of a discrete set (See Peters, G. W. M., J. F. M. Schoonen, F. P. T. Baaijens, and H. E. H. Meijer, "On the Performance of Enhanced Constitutive Models for Polymer Melts in a Cross-Slot Flow." J Non-Newtonian Fluid Mech 82 387-427 (1999).), hence, $$\tau = \sum_{i=1}^{M} \tau_i \tag{4}$$

where M denotes the total number of the discrete set.

The differential constitutive equation can describe a time-evolution equation of the stress tensor, including both differential and integral forms. The differential constitutive equation is famous to apply in the VE flow simulations, and its general form (See Peters, G. W. M., J. F. M. Schoonen, F. P. T. Baaijens, and H. E. H. Meijer, "On the Performance of Enhanced Constitutive Models for Polymer Melts in a Cross-Slot Flow." J Non-Newtonian Fluid Mech 82 387-427 (1999).) of one individual mode can be defined:

$$\lambda_0 \left[ \overset{\nabla}{\tau} + f_c(\tau, D) + f_d(\tau) \right] + \tau = 2\eta_0 D \tag{5}$$

$$\overset{\nabla}{\tau} = \frac{\partial \tau}{\partial t} + u \cdot \nabla \tau - \nabla u \cdot \tau - \tau \cdot \nabla u^T \tag{6}$$

where $\lambda_0$ is the relaxation time and $\eta_0$ is the viscosity constant; $\overset{\nabla}{\tau}$ is upper convected time derivative of the extra stress tensor; both tensor functions $f_c(\tau, D)$ and $f_d(\tau)$ that are related to the tensors $\tau$ and D depend upon the chosen constitutive model.

The Phan-Thien & Tanner (PTT) model is the famous differential constitutive equation, $$\lambda_0 \overset{\nabla}{\tau} + f(I_\tau)\tau = 2\eta_0 D \tag{7}$$

The function $f(I_\tau)$ is related to the first invariant of the extra stress tensor $I_\tau$, $$f(I_\tau) = 1 + \varepsilon \frac{\lambda_0}{\eta_0} I_\tau \tag{8}$$

$$I_\tau = tr(\tau) = \tau_{11} + \tau_{22} + \tau_{33} \tag{9}$$

where $\varepsilon$ is the adjustable parameter; $\tau_{11}$, $\tau_{22}$, and $\tau_{33}$ are normal stress components. The PTT model has been achieved in the 3D flow computation to simulate the VE behaviors. However, there is a numerical convergent issue especially in high flow rates, due to the numerical singularity.

In addition, the K-BKZ (Kaye-Bernstein-Kearsley-Zapas) model (See Bird, R. B., R. C. Armstrong, and O. Hassager, *Dynamics of Polymeric Liquids: Fluid Mechanics* (Wiley-Interscience, New York, 1987)) is the well-known "integral" constitutive equation:

$$\tau = \int_{-\infty}^{t} M(t-t') h(I_B, II_B) B(t, t') dt' \tag{10}$$

where M(t-t') is a time-memory function; $h(I_B, II_B)$ is a damping term of the two invariants ($I_B$, $II_B$) of the Finger strain tensor B; t' and t are the past and present times, respectively.

The integral equation of the stress tensor above is complicated and so are not repeated here. In the "2D" flow computation, such a model can be used in high flow rates. Unfortunately, it is difficult for the 3D computation, due to the streamline integration scheme. Therefore, the objective of the invention is to effectively improve the numerical convergent issue of the "differential" constitutive equations in the 3D flow simulation. Details of the constitutive equations are available elsewhere (See Bird, R. B., R. C. Armstrong, and O. Hassager, *Dynamics of Polymeric Liquids: Fluid Mechanics* (Wiley-Interscience, New York, 1987)). Therefore, the objective of the invention is to effectively improve the numerical convergent issue of the "differential" constitutive equations in the 3D flow simulation.

For the anisotropic "fiber-filled" materials, Favaloro et al. and Tseng et. al. (See, Favaloro, A. J., H.-C. Tseng, and R. B. Pipes, "A New Anisotropic Viscous Constitutive Model for Composites Molding Simulation," Composites Part A: Applied Science and Manufacturing 115 112-122 (2018); Tseng, H.-C. and A. J. Favaloro, "The Use of Informed Isotropic Constitutive Equation to Simulate Anisotropic Rheological Behaviors in Fiber Suspensions," J Rheol 63 263-274 (2019); Favaloro, A. J., R. B. Pipes, and H.-C. Tseng, "Molding System for Preparing Fiber-Reinforced Thermoplastic Composite Article," U.S. patent Ser. No. 10/201,918 (2019); Tseng, H.-C., R.-Y. Chang, and C.-H. Hsu, "Molding System for Preparing Fiber-Reinforced Thermoplastic Composite Article," U.S. patent Ser. No. 10/201,921 (2019)) recently derive that fourth-order viscosity tensor $\eta_4 = [\eta_{ijkl}]$ is transferred to obtain an informed isotropic (IISO) viscosity scalar $\eta^{IISO}$ in the steady-state stress tensor $\tau$, $$\tau = \eta_4 : D = 2\eta^{IISO} D \quad (11)$$

$$\eta^{IISO} = \frac{\tau : D}{2D : D} \quad (12)$$

where $\eta_4 = [\eta_{ijkl}]$ is the fourth-order viscosity tensor. They have demonstrated that the IISO viscosity scalar can improve the previous numerical convergent issue.

However, for the "un-filled" polymers solving the differential VE constitutive equations easily yield a numerical divergent issue at high flow rates, as well. Such a problem has been largely unresolved. Thus, the present inventors are inspired by the IISO conception: the VE stress tensor $\tau^{VE}$ evolved from the differential/integral constitutive equations are transferred to get an effective viscosity scalar $\eta^*$, $$\eta^* = \frac{\tau^{VE} : D}{2D : D} \quad (13)$$

The same as the fiber orientation tensor, $\tau^{VE}$ also is a "directional" tensor, involving the off-diagonal components of shear viscous stresses and the diagonal components of extension elastic stresses. It is critical that the elastic stress tensor contribution is transferred to an effective viscosity scalar. Then, this effective viscosity with the VE effect is given into the equation of motion and energy based on the viscosity, as below:

$$\frac{\partial}{\partial t}(\rho u) + \nabla \cdot (\rho uu) = -\nabla P + \eta^* \nabla^2 u + \rho g \quad (14)$$

$$\rho C_P \left( \frac{\partial T}{\partial t} + u \cdot \nabla T \right) = \nabla \cdot (k \nabla T) + \eta^* \dot{\gamma}^2 \quad (15)$$

For solving the governing equations, the VE constitutive equation and the effective viscosity and stress, the flowchart is drawn below. In addition, this flowchart will be verified to improve the numerical divergent issue for the 3D contraction flow simulation.

Figure 3:
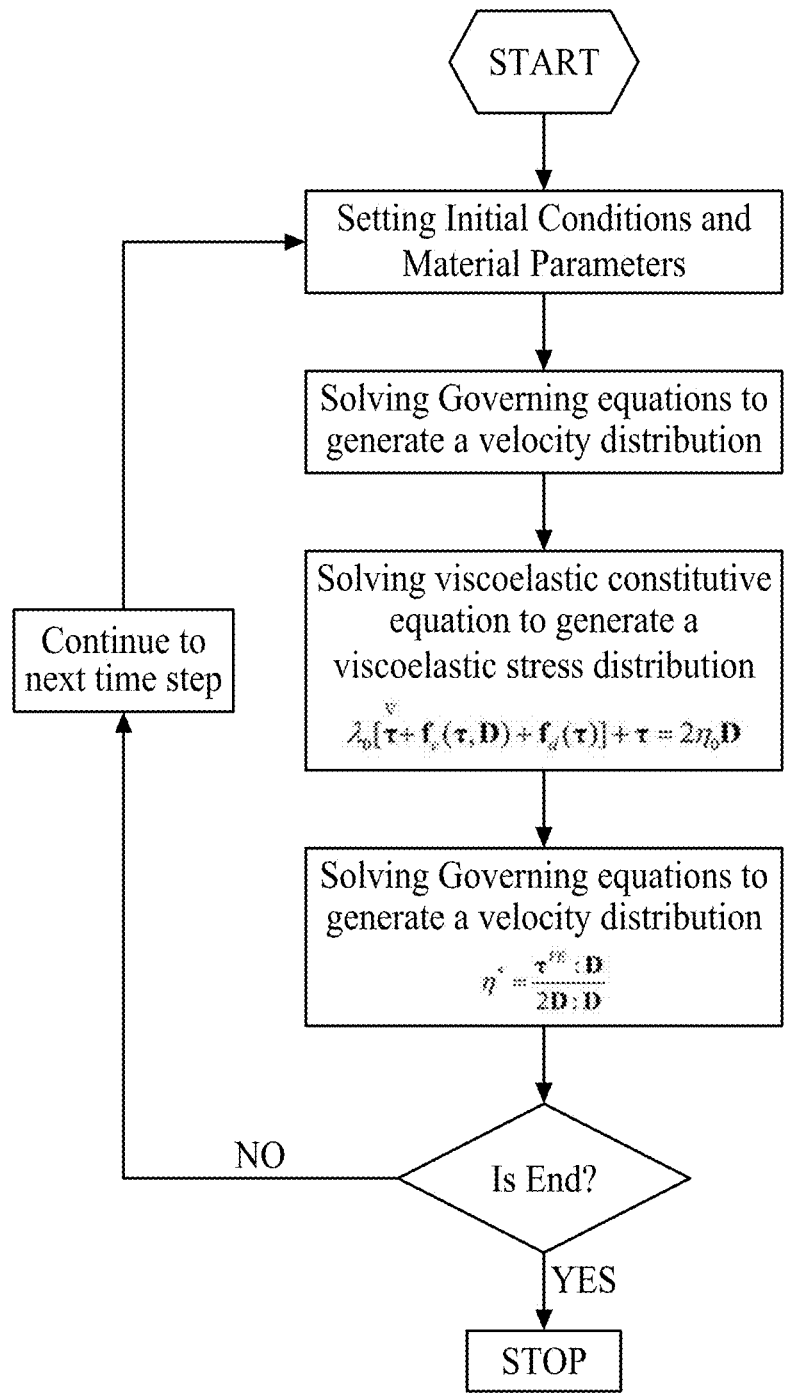
FIG. 3 is a flowchart illustrating an injection-molding simulation operation in accordance with some embodiments of the present disclosure.

FIG. 3 is a flowchart showing an injection-molding simulation operation in accordance with some embodiments of the present disclosure. Referring to FIG. 3, in injection-molding simulation operations, the governing equations of fluid mechanics that describe the transient flow behaviors are as follows:

$$\frac{\partial \rho}{\partial t} + \nabla \cdot \rho u = 0 \quad (16)$$

$$\frac{\partial}{\partial t}(\rho u) + \nabla \cdot (\rho uu) = \nabla \cdot \sigma + \rho g \quad (17)$$

$$\sigma = -PI + \tau \quad (18)$$
$$\tau = 2\eta D$$

-continued $$\rho C_P \left( \frac{\partial T}{\partial t} + v \cdot \nabla T \right) = \nabla \cdot (k \nabla T) + \eta \dot{\gamma}^2 \quad (19)$$

where ρ represents density; u represents the velocity vector; t represents time; σ represents the total stress tensor; τ represents the extra stress tensor; ∇u represents the velocity gradient tensor; D the rare-of-deformation tensor (i.e., symmetric tensor of ∇u) g represents the acceleration vector of gravity; P represents pressure; $C_p$ represents specific heat; T represents temperature; k represents thermal conductivity; η represents shear viscosity; and $\dot{\gamma}$ represents the total strain rate.

Solving the governing equations (16)-(19) requires a transient state analysis, which can be performed numerically using a computer (See Rong-Yeu Chang and Wen-hsien Yang, "Numerical simulation of mold filling in injection molding using a three-dimensional finite volume approach," International Journal for Numerical Methods in Fluids Volume 37, Issue 2, pages 125-148, Sep. 30, 2001; the entirety of the above-mentioned publication is hereby incorporated by reference herein and made a part of this specification). During the transient state analysis, the process variables that change with time are a not zero; i.e., the partial derivatives (∂/∂t) in the governing equations (16)-(19) are not considered zero.

The true 3D Finite Volume Method (FVM) is employed due to its robustness and efficiency to solve the transient flow fields in a complex 3D geometrical article. In some embodiments of the present disclosure, the simulation flow in FIG. 3 can be implemented using commercial injection-molding simulation software, Moldex3D (CoreTech System Co. of Taiwan), to facilitate the orientation predictions of the molding resin.

Figure 4:
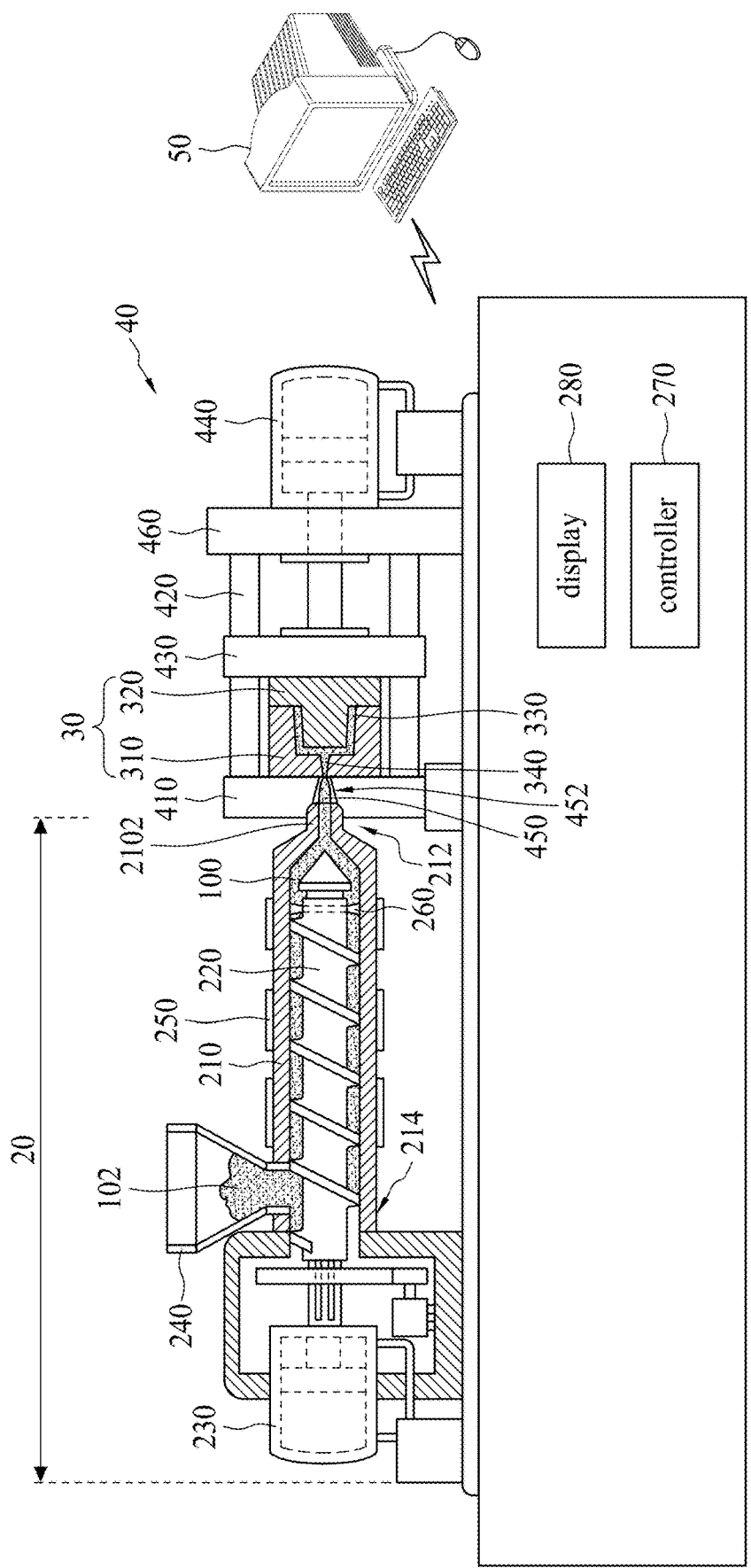
FIG. 4 is a schematic view of an injection-molding apparatus in accordance with some embodiments of the present disclosure.

FIG. 4 is a schematic view of an injection-molding apparatus 10 in accordance with some embodiments of the present disclosure. Referring to FIG. 4, the injection-molding apparatus 10 that can be used to carry out molding includes a molding machine 20, a mold 30, a clamping assembly 40 and a computer 50. The molding machine 20 includes a barrel 210 having a downstream end 212 connected to the mold 30. The mold 30 includes mold halves 310 and 320 to define a mold cavity 330 and a runner 340 in communication with the mold cavity 330.

The clamping assembly 40 is in operative connection with the mold 30 for clamping the mold halves 310 and 320. In some embodiments, the clamping assembly 40 includes a fixed plate 410, a plurality of tie bars 420 mounted on the fixed plate 410, and a moving plate 430 slidably engaged with the tie bars 420 and guided by a driving cylinder 440. The mold half 310 proximal to the barrel 210 is secured on the fixed plate 410, and the mold half 320 distal to the barrel 210 is secured on the moving plate 430 in any suitable manner, wherein the driving cylinder 440 drives the moving plate 430 to open or close the mold 30. In some embodiments, the barrel 210 includes a nozzle 2102 adapted to engage a sprue 450 in the fixed plate 410. In some embodiments, the sprue 450 is in communication with the runner 340 as the mold half 310 is assembled with the fixed plate 410. In some embodiments, the fixed plate 410 may be equipped with a sprue bushing 452 including the sprue 450 and receiving the nozzle 2102 during an injection time. A molding material 100 under pressure is delivered to the sprue bush 452 from the nozzle 2102 pressed tightly against the sprue bush 452 in order to deliver the molding material 100 to the sprue 450 during a filling stage of the injection time.

In some embodiments, the clamping assembly 40 further includes an ejector plate 460 mounted with at least one ejector pin (not shown), wherein the moving plate 430 is disposed between the fixed plate 410 and the ejector plate 460. In some embodiments, the ejector plate 460 is fixed on one of the plurality of tie bars 420. In some embodiments, the driving cylinder 440 penetrates the ejector plate 460 and directly connects to the moving plate 430 to open or close the mold 30. After the mold halves 310 and 320 are separated (i.e., the mold 30 is opened), a distance between the moving plate 430 and the ejector plate 460 is reduced, so the ejector pin can penetrate through the ejector plate 460 to push a molded product out of the mold 30.

A screw 220 is mounted for moving within the barrel and is operably connected, at an upstream end 214 opposite to the downstream end 212 of the barrel 210, to a driving motor 230. The molding machine 20 processes material, such as plastic granules 102, by feeding the material through a hopper 240 to the barrel 210 in order to make the material soft and force the molding material 100 into the mold 30 by the use of the screw 220, wherein the phase of the plastic granules 102 is changed from solid to liquid by at least one heater band 250 surrounding the barrel 210. In some embodiments, the molding machine 20 further includes a check valve 260 mounted on the screw 220, wherein the check valve 260 is in tight contact with the barrel 210 during the filling stage, and the check valve 260 is open for allowing the liquid material to flow to the downstream end 212 of the barrel 210 during a packing stage. In some embodiments, if the mold cavity 330 is almost filled with the molding material 100, a packing process proceeds. In some embodiments, the screw 220 rotates and moves toward the upstream end 214 of the barrel 210 during the packing stage.

The injection-molding apparatus 10 further includes a controller 270 for controlling and monitoring the real-time functions of the molding machine 20, and a display 280 for displaying data related to the performance and operation of the molding machine 20 to on-site technicians. In some embodiments, the display 280 is further configured to accept input data from the on-site technicians. In other words, the display 280 is provided with a communications link directly with the controller 270 to provide real-time control of the molding machine 20 by the on-site technicians particularly where the on-site technicians' intervention is required.

In some embodiments, the injection-molding apparatus 10 can further include operation interface communication links among the controller 270, the display 280 and peripheral devices, and a program sequence of operation which allows the operation interface to monitor diagnostic functions of the controller 270 and the molding machine 20, trigger sound and/or light alarms regarding conditions of the molding machine 20, receive performance data from the molding machine 20, and receive input data from the display 280.

The computer 50 is associated with the molding machine 20 and is configured to execute CAE simulation software and transmit at least one simulation result to the controller 270 through a connection such as a hard wire connection or a wireless coupling. In some embodiments, the computer 50 includes a standardized operation system capable of running general-purpose application software for assisting with the analysis of process performance data and for communicating with the controller 270 and the display 280 via communication ports of each.

Figure 5:
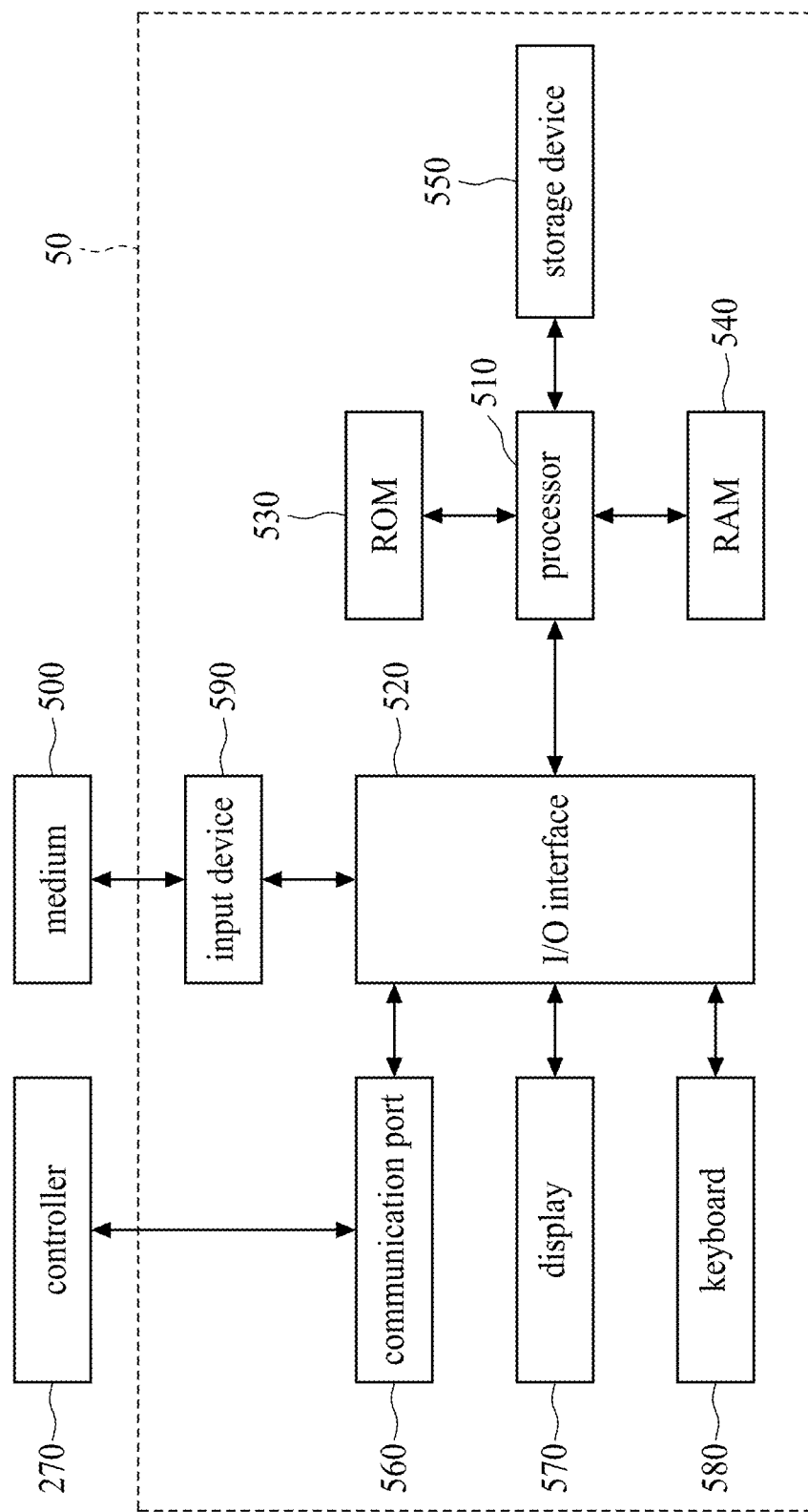
FIG. 5 is a functional block diagram of the computer in FIG. 4.

FIG. 5 is a functional block diagram of the computer 50 in FIG. 4. Referring to FIG. 5, the computer 50 includes a processing module 510 such as a processor adapted to perform a computer-implemented simulation method for use in injection molding, an input/output (I/O) interface 520 electrically coupled to the processing module 510, and memories, which may include a read-only memory (ROM) 530, a random access memory (RAM) 540 and a storage device 550. The ROM 530, the RAM 540 and the storage device 550 are communicatively coupled to the processing module 510.

The computer 50 further includes a communication port 560 associated with the controller 270 of the molding machine 20. The computer 50 may further include one or more accompanying input/output devices including a display 570, a keyboard 580 and one or more other input devices 590. The input devices 590 may include a card reader, an optical disk drive or any other device that allows the computer 50 to receive input from the on-site technicians. In some embodiments, the input devices 590 are configured to input computer instructions (software algorithms) stored in a non-transitory computer-readable medium 500, and the processing module 510 is configured to execute operations for performing a computer-implemented injection-molding simulation method according to the computer instructions. In some embodiments, the processing module 510 reads software algorithms from the other input device 590 or the storage device 550, executes the calculation steps, and stores the calculated result in the RAM 540.

Figure 6:
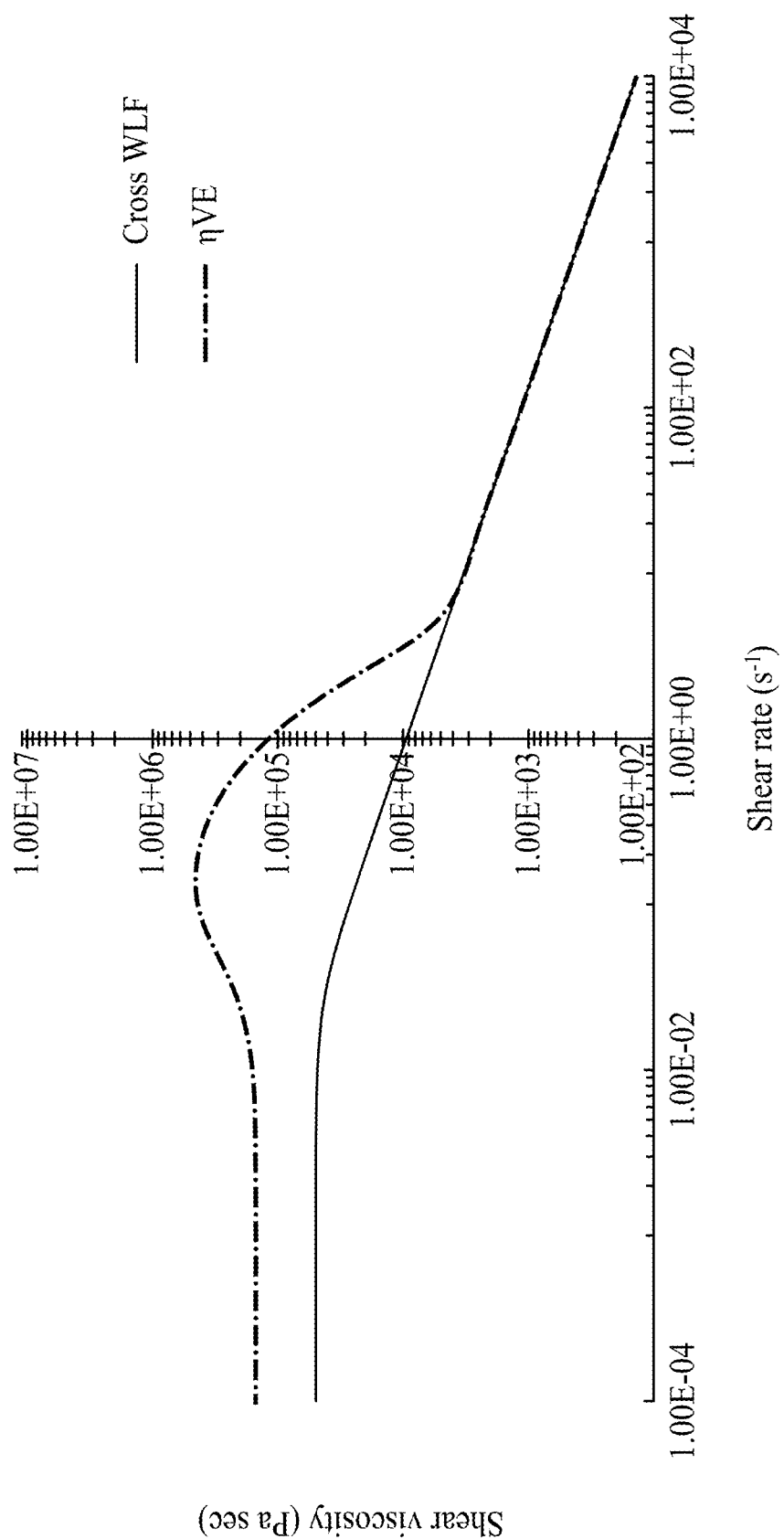
FIG. 6 is a plot showing the stress distribution of the molding resin in the mold cavity with respect to the shear rate, using different models.
Figure 7:
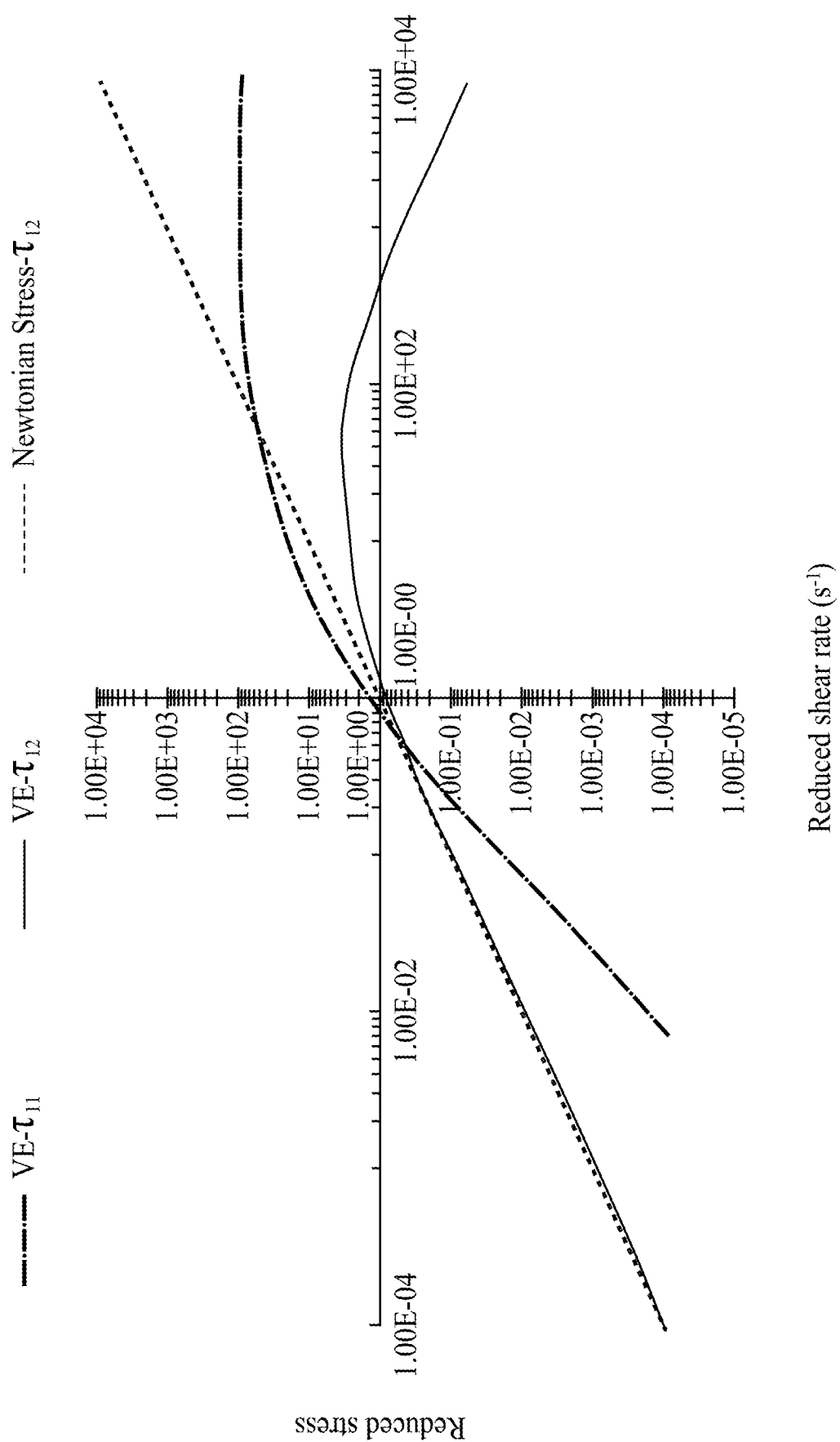
FIG. 7 is a plot showing the viscosity distribution of the molding resin in the mold cavity with respect to the shear rate, using different models.

FIG. 6 is a plot showing the stress distribution of the molding resin in the mold cavity with respect to the shear rate, using different models, and FIG. 7 is a plot showing the viscosity distribution of the molding resin in the mold cavity with respect to the shear rate, using different models. As clearly shown in FIG. 6, the stress distribution of the molding resin with respect to the shear rate, using the conventional Newtonian model is isotropic; in contrast, the stress distribution of the molding resin with respect to the shear rate, using the present model considering the elastic effect of the molding resin is anisotropic. Correspondingly, the viscosity distribution of the molding resin with respect to the shear rate, using the conventional Cross WLF model is different from that using the present model considering the elastic effect of the molding resin is anisotropic.

Figure 8:
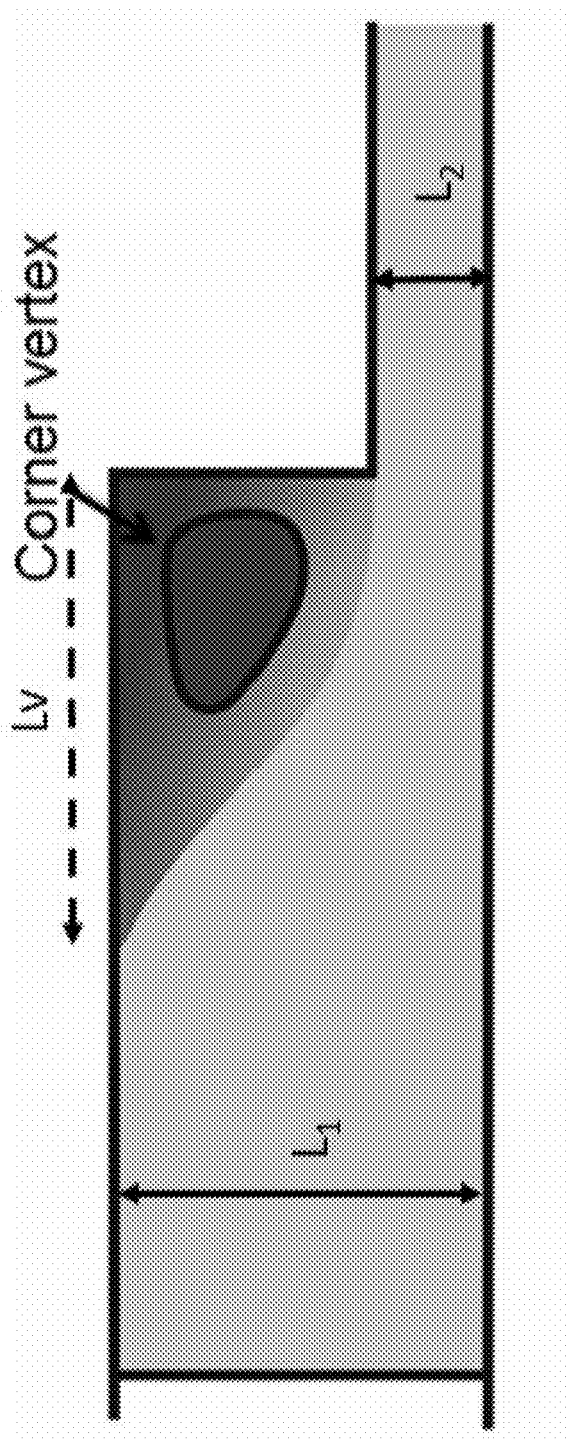
FIG. 8 is a schematic diagram showing a fluid driven from a reservoir ($L_1$=3.0 mm size) through a planar abrupt contraction channel ($L_2$=0.75 mm size) with a 4:1 contraction ratio ($L_1/L_2$).
Figure 9:
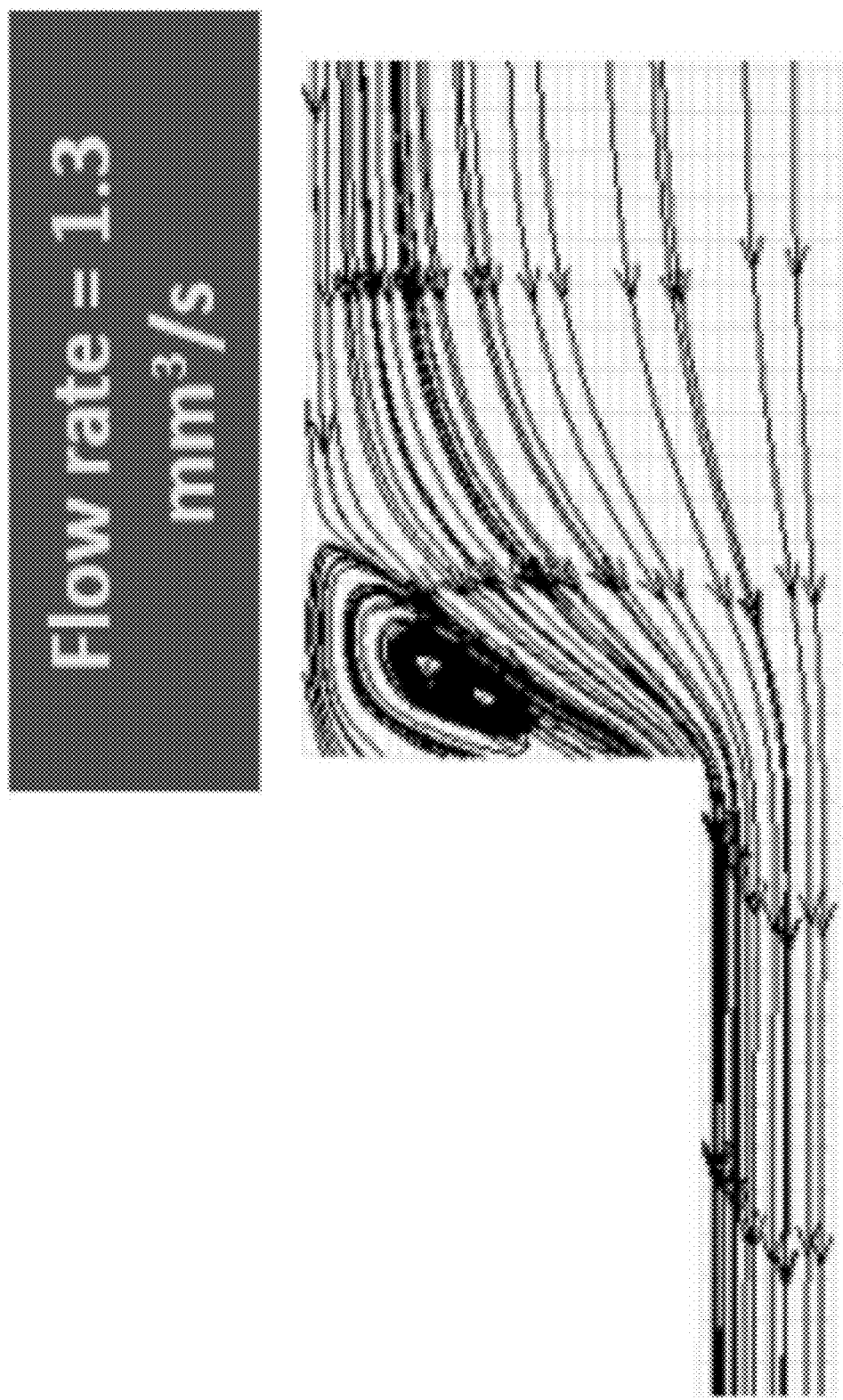
FIGS. 9-12 show the increase of the vortex size with respect to the flow rates in accordance with some comparative embodiments of the present disclosure.
Figure 10:
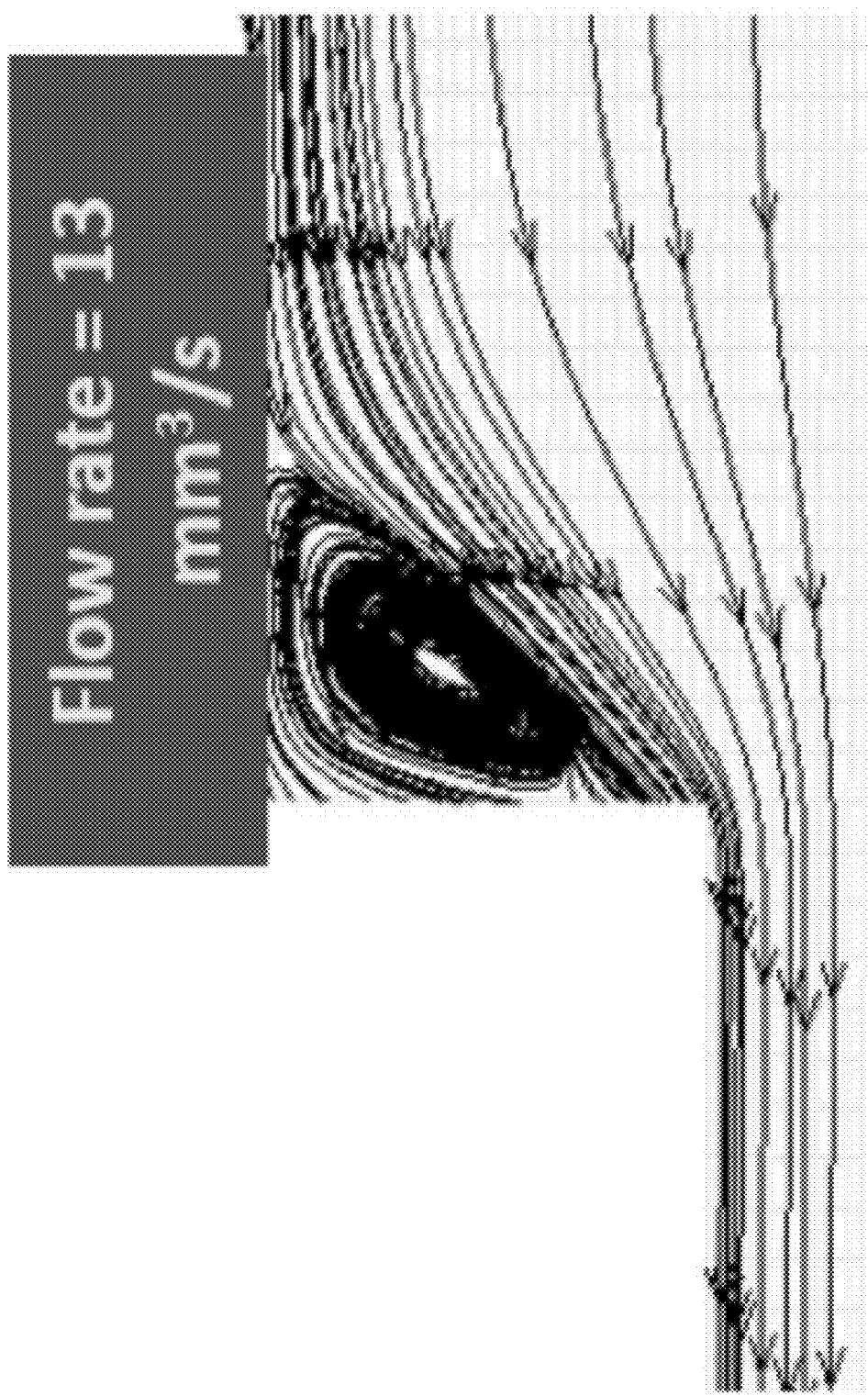
Figure 11:
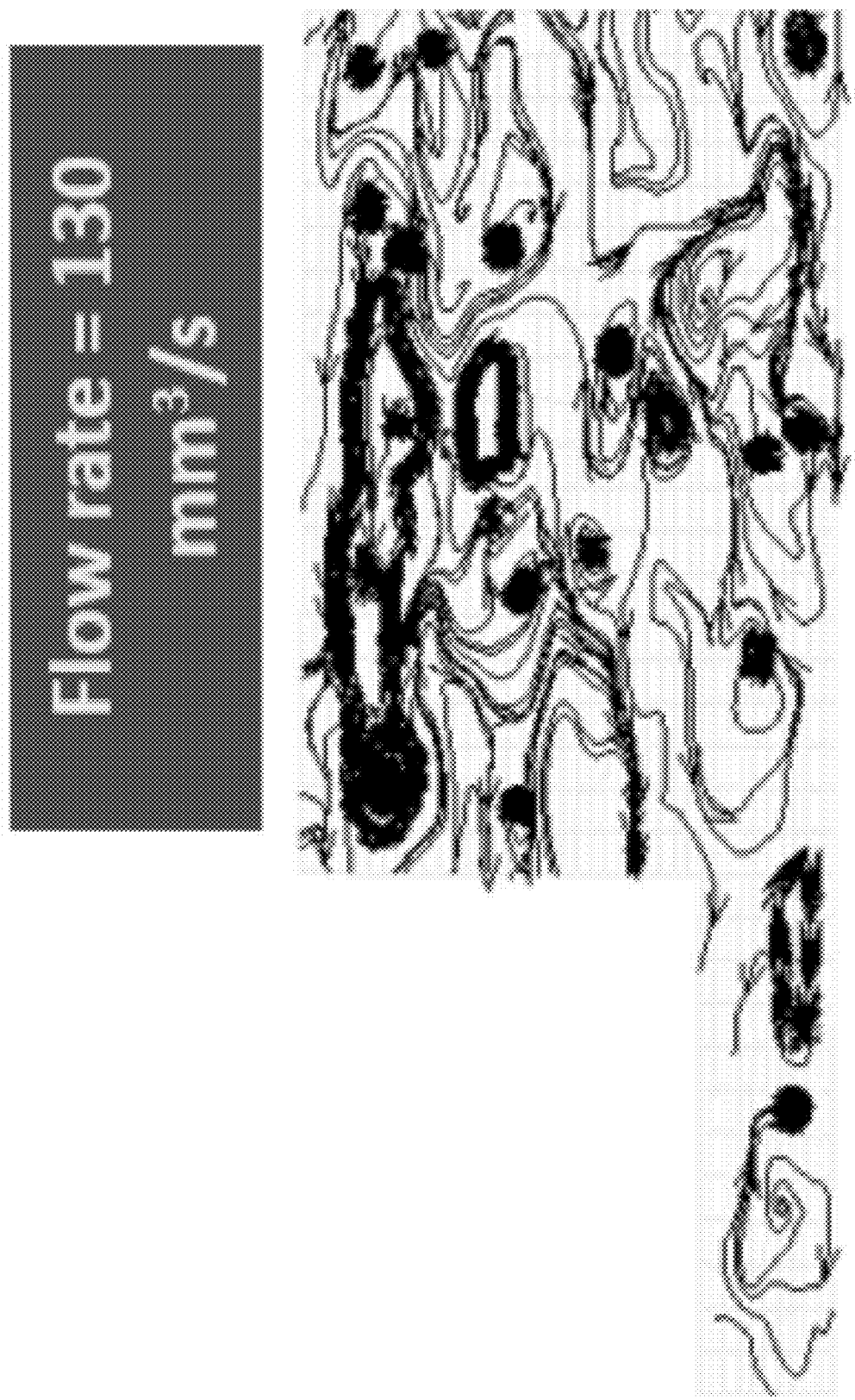
Figure 12:
Figure 13:
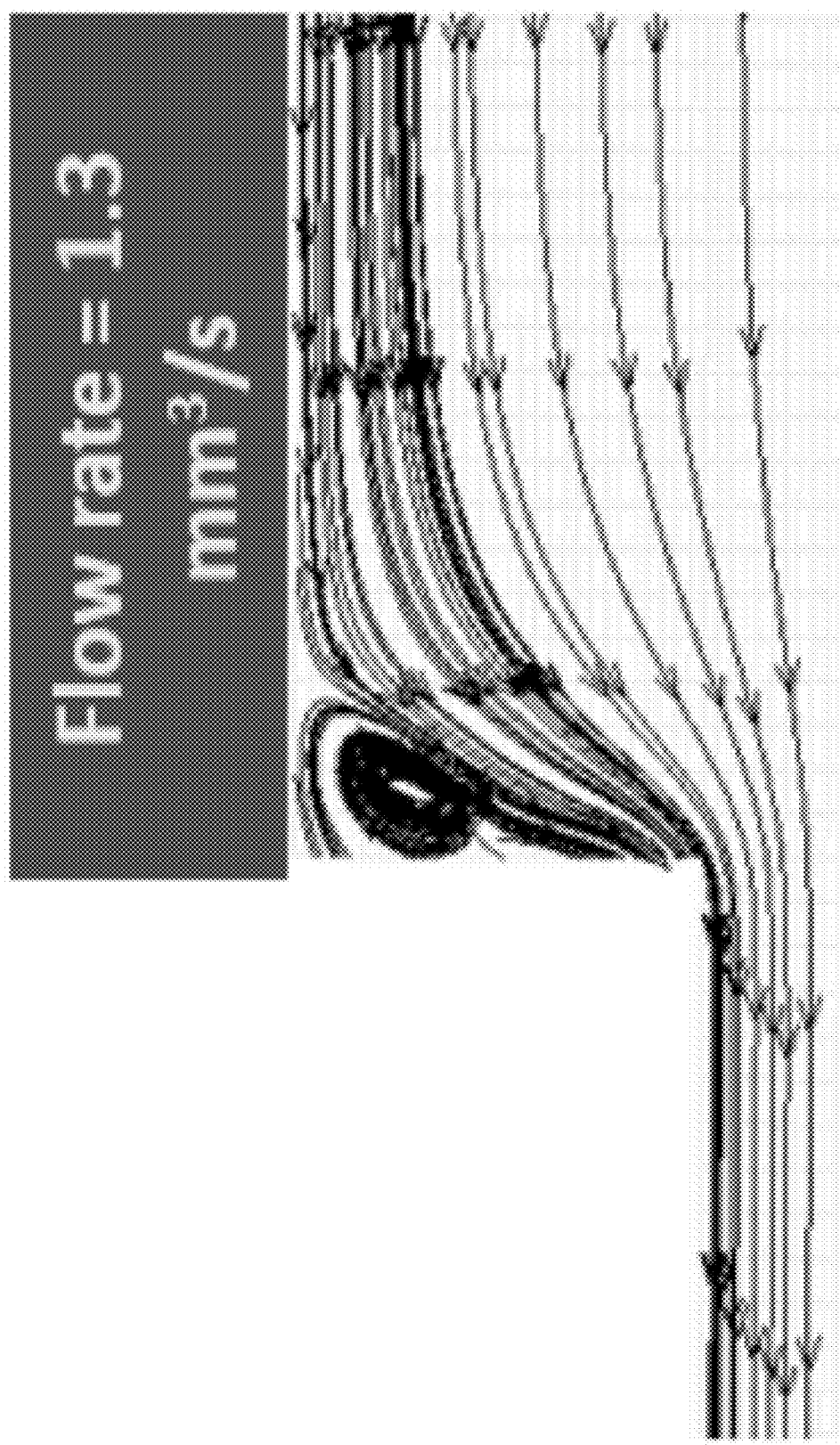
FIGS. 13-16 show the increase of the vortex size with respect to the flow rates in accordance with some embodiments of the present disclosure.
Figure 14:
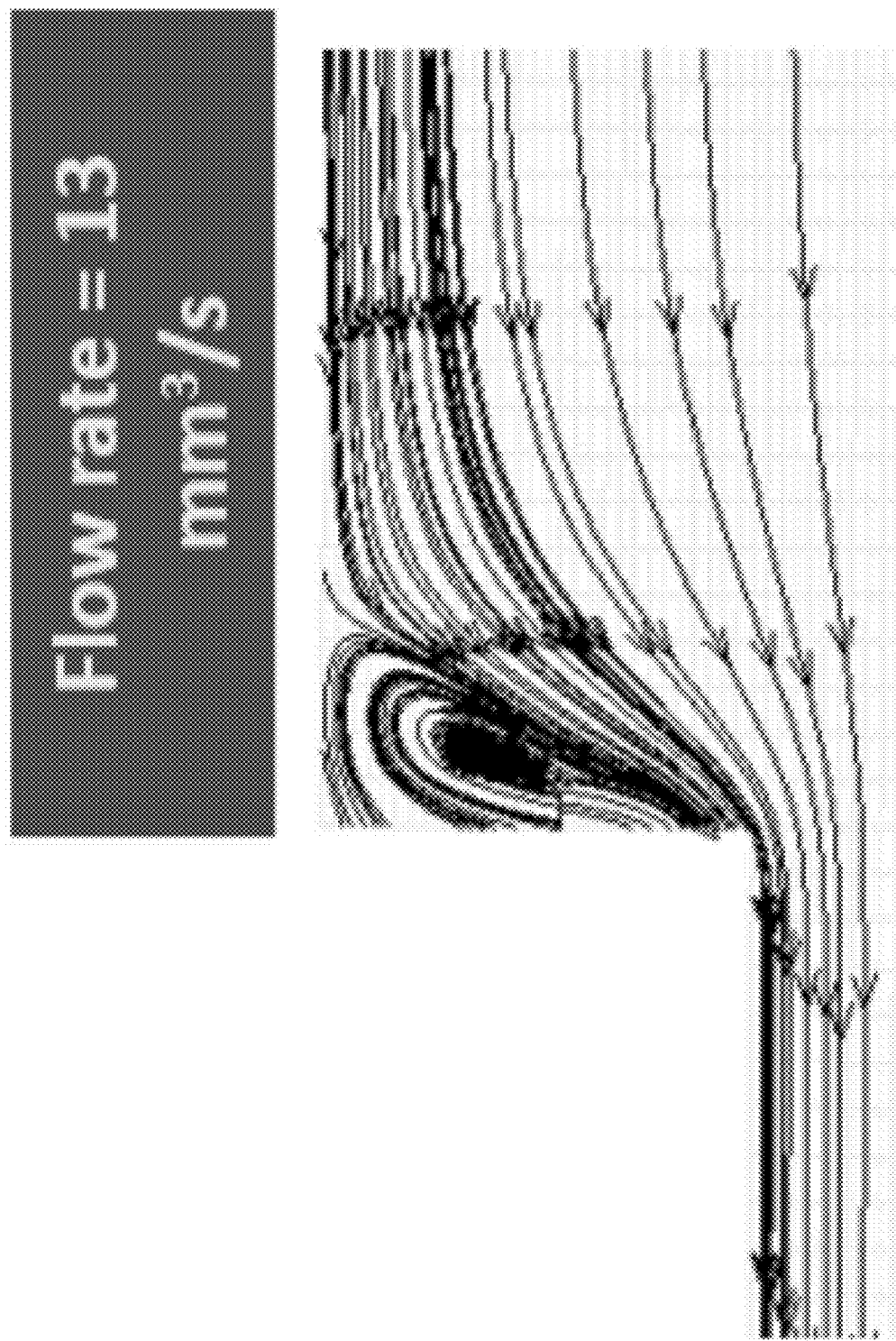
Figure 15:
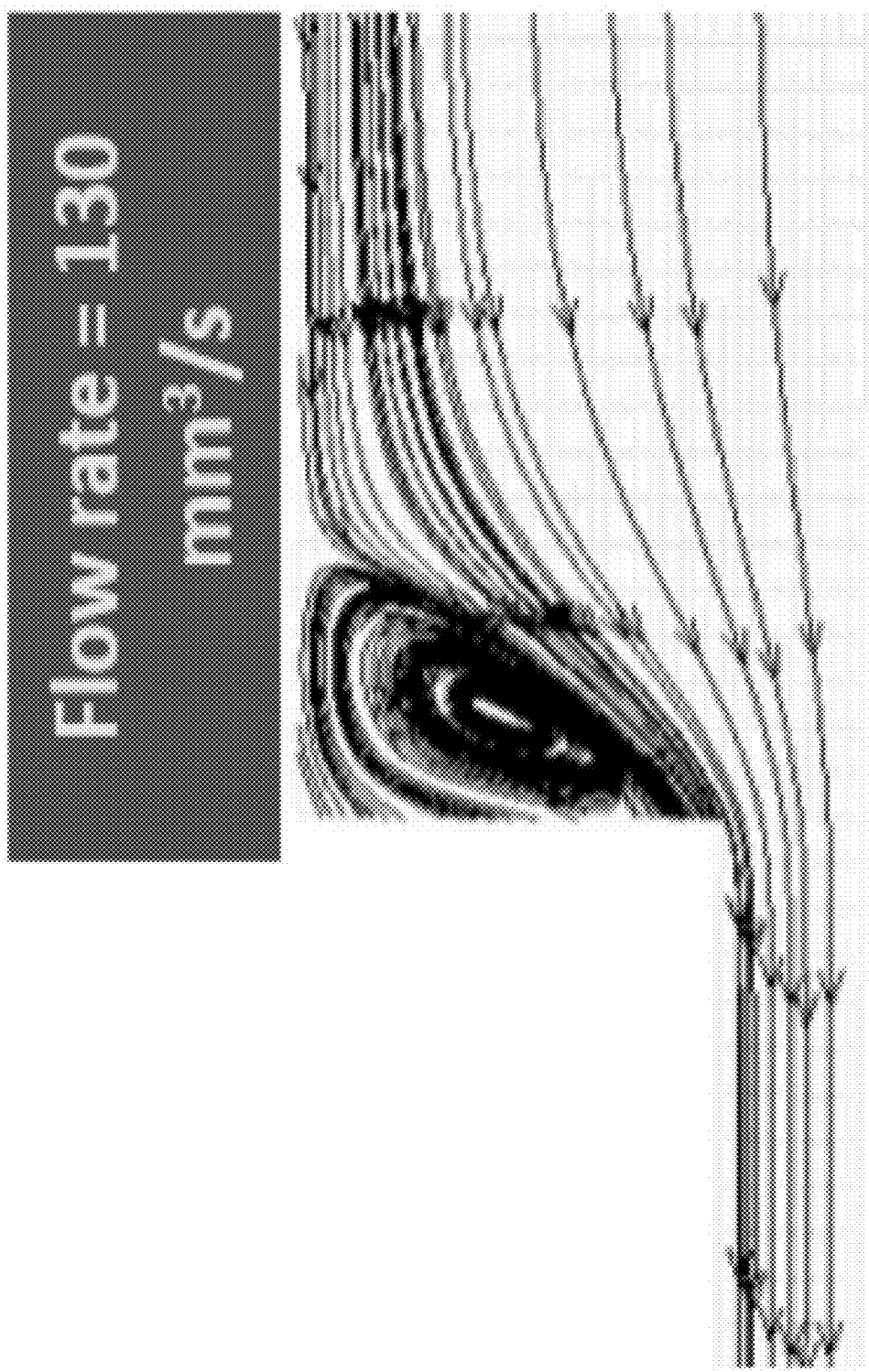
Figure 16:
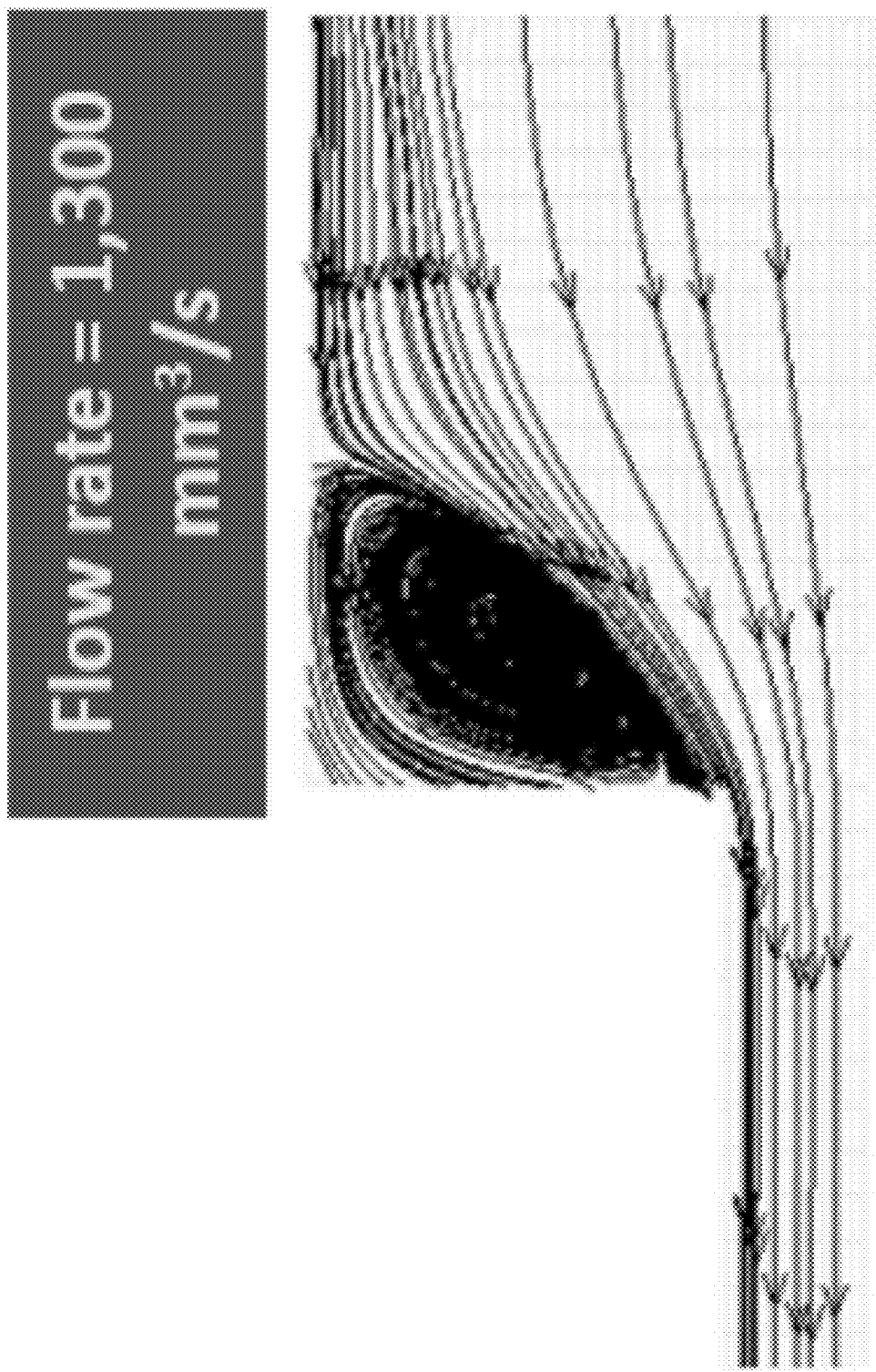

In our present work, a planar contraction flow simulation was performed via Moldex3D. FIG. 8 is a schematic diagram showing a fluid driven from a reservoir ($L_1$=3 0 mm size) through a planar abrupt contraction channel ($L_2$=0.75 mm size) with a 4:1 contraction ratio ($L_1/L_2$). As clearly shown in FIG. 8, the vertex occurs at the corner, wherein Lv represents the vortex size. The material of interest was the well-known IUPAC-LDPE (low-density polyethylene) used in the polymer rheology. For the LEPD material at the isothermal temperature 150° C., the PTT model parameters and the linear viscoelastic spectrum (relaxation time and viscosity constant) can be referred to elsewhere. As a result, FIGS. 9-12 show the increase of the vortex size with respect to the flow rates in accordance with some comparative embodiments (using the conventional PTT differential model without considering the elastic effect of the molding resin) of the present disclosure; and FIGS. 13-16 show the increase of the vortex size with respect to the flow rates in accordance with some embodiments of the present disclosure. As shown in FIGS. 9-12, the vortex size is increased from 0.13 mm$^3$/s to 1.3 mm$^3$/s. However, the divergent results are found at high flow rates (130 and 1300 mm3/s).

Such a numerical convergent issue is a long-running problem requiring an urgent solution in the industrial application of state-of-the-art predictive engineering tools for VE flow simulation of polymer rheology. In contrast to the conventional PTT differential model without considering the elastic effect of the molding resin, considering the elastic effect of the molding resin in the present disclosure, FIGS. 13-16 shows the vortex size is increased with flow rates, while there are stable results especially at high flow rates. Therefore, the present disclosure is verified to be an effective method for resolving the numerical convergent issue of VE constitutive equations.

The present disclosure provides a molding system for preparing an injection-molded article, comprising: a molding machine; a mold disposed on the molding machine and having a mold cavity for being filled with a molding resin; a processing module configured to generate an anisotropic viscosity distribution of the molding resin in the mold cavity based on a molding condition for the molding machine, wherein the anisotropic viscosity distribution of the molding resin is generated based in part on an elastic effect of the molding resin; and a controller operably communicating with the processing module and configured to control the molding machine with the molding condition using the generated anisotropic viscosity distribution of the molding resin to perform an actual molding process for preparing the injection-molded article.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein, may be utilized according to the present disclosure. Accordingly, the appended claims are intended to include within their scope such processes, machines, manufacture, compositions of matter, means, methods, and steps.

What is claimed is:

1. A molding system for preparing an injection-molded article, comprising:
   a molding machine, including a barrel, a screw mounted for moving within the barrel, a driving motor driving the screw to move a molding resin;
   a mold disposed on the molding machine and connected to the barrel of the molding machine to receive the molding resin, and having a mold cavity for being filled with the molding resin;
   a processing module configured to simulate an anisotropic viscosity distribution of the molding resin in the mold cavity based on a molding condition for the molding machine, wherein the anisotropic viscosity distribution of the molding resin is simulated based in part on an elastic effect of the molding resin; and
   a controller operably communicating with the processing module to receive the simulated anisotropic viscosity distribution of the molding resin and with the molding machine to be configured to control the driving motor of the molding machine with the molding condition to move the screw to transfer the molding resin at a desired flow rate according to the simulated anisotropic viscosity distribution of the molding resin to perform an actual molding process for preparing the injection-molded article.

2. The molding system of claim 1, wherein the processing module is configured to simulate a velocity distribution of the molding resin in the mold cavity, and the anisotropic viscosity distribution of the molding resin is simulated based on the velocity distribution.

3. The molding system of claim 1, wherein the processing module is configured to simulate the anisotropic viscosity distribution based in part on an anisotropic viscoelastic (VE) stress distribution of the molding resin in the mold cavity.

4. The molding system of claim 3, wherein the anisotropic viscosity distribution is represented using an expression:

$$\eta^* = \frac{\tau^{VE}:D}{2D:D}$$

where $\eta^*$ represents an effective viscosity scalar, $\tau^{VE}$ represents the anisotropic viscoelastic stress distribution of the molding resin in the mold cavity, and D represents a rate-of-strain tensor.

5. The molding system of claim 3, wherein the anisotropic viscoelastic stress distribution is represented using an expression:

$$\lambda_0 \overset{\nabla}{\tau} + f(I_\tau)\tau = 2\eta_0 D$$

$$f(I_\tau) = 1 + \varepsilon \frac{\lambda_0}{\eta_0} I_\tau$$

$$I_\tau = tr(\tau) = \tau_{11} + \tau_{22} + \tau_{33}$$

where $\lambda_0$ is the relaxation time and $\eta_0$ is the viscosity constant; $\overset{\nabla}{\tau}$ is upper convected time derivative of the extra stress tensor; $\varepsilon$ is the adjustable parameter; $\tau_{11}$, $\tau_{22}$, and $\tau_{33}$ are normal stress components.

6. The molding system of claim 3, wherein the anisotropic viscoelastic stress distribution is represented using an expression:

$$\tau = \int_{-\infty}^{t} M(t-t')[\phi_1(I_B, II_B)B(t,t') + \phi_2(I_B, II_B)B^{-1}(t,t')]dt'$$

where M(t–t') is a time-memory function; $h(I_B, II_B)$ is a damping function of the two invariants ($I_B$ and $II_B$) of the Finger strain tensor B; t' and t are the past and present times, respectively.

* * * * *